United States Patent [19]
Dunn

[11] Patent Number: 6,140,797
[45] Date of Patent: *Oct. 31, 2000

[54] COMPACT IMPROVED AUTONOMOUS AUXILIARY ENGINE STARTING APPARATUS

[76] Inventor: James P. Dunn, 60 Prescott St., Worchester, Mass. 01605

[*] Notice: This patent is subject to a terminal disclaimer.

[21] Appl. No.: 09/441,636

[22] Filed: Nov. 16, 1999

Related U.S. Application Data

[63] Continuation-in-part of application No. 09/206,795, Dec. 7, 1998, Pat. No. 6,020,716.
[60] Provisional application No. 60/103,683, Oct. 8, 1998.

[51] Int. Cl.$^7$ .................................................... H02J 7/00
[52] U.S. Cl. ......................... 320/105; 439/504; 320/104
[58] Field of Search ................................. 320/105, 104, 320/107; 340/636; 439/504

[56] References Cited

U.S. PATENT DOCUMENTS

| | | | |
|---|---|---|---|
| 4,969,834 | 11/1990 | Johnson | 320/165 |
| 5,793,185 | 8/1998 | Prelec et al. | 320/165 |
| 5,984,718 | 11/1999 | James | 439/504 |
| 5,993,250 | 11/1999 | Hayman | 320/105 |
| 6,020,716 | 2/2000 | Dunn | 320/105 |

Primary Examiner—Peter S. Wong
Assistant Examiner—Lawrence Luk
Attorney, Agent, or Firm—Fish and Associates, LLP

[57] ABSTRACT

An auxiliary failsafe engine starting apparatus locates the batteries or other power storage devices with respect to the current carrying cable(s) to provide high conformability between extended and storage configurations, and includes a protective power control switching module. High conformability of an apparatus is defined herein as being configurable between a greatest extended configuration having a length ($l_e$) and a storage configuration having a length ($l_s$), wherein $l_e \geq 3\, l_s$. Preferred apparatus have conformability ratios of $\geq 3$, $\geq 4$, $\geq 5$, $\geq 7.5$, and $\geq 10$. Preferred power sources provide an electrical potential of at least 6 volts, and a current of at least 40 amps. More preferable power sources provide sustainable currents of at least 100 amps, and even more preferable power sources provide sustainable currents of at least 250 amps. Preferred cables are relatively long, measuring up to 4 feet or more, total extended length.

17 Claims, 3 Drawing Sheets

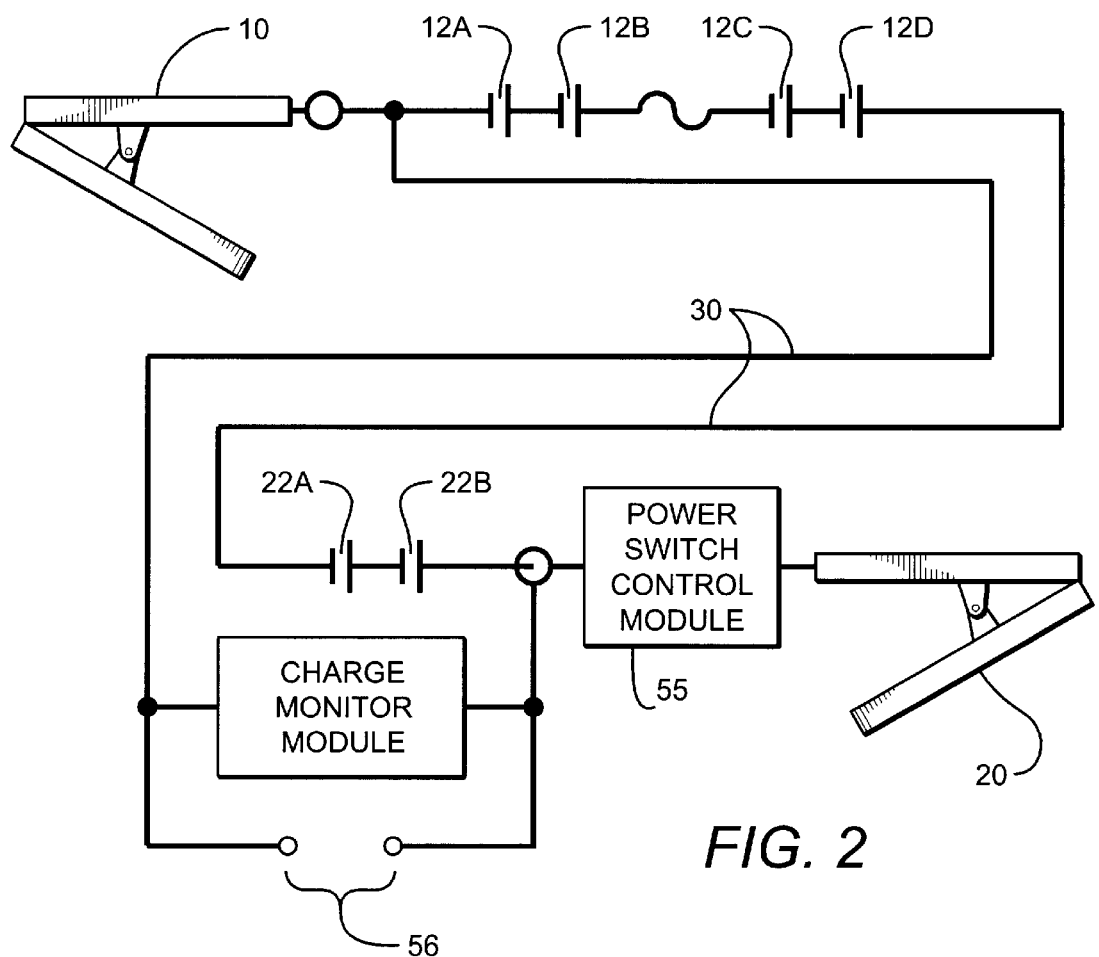
FIG. 2
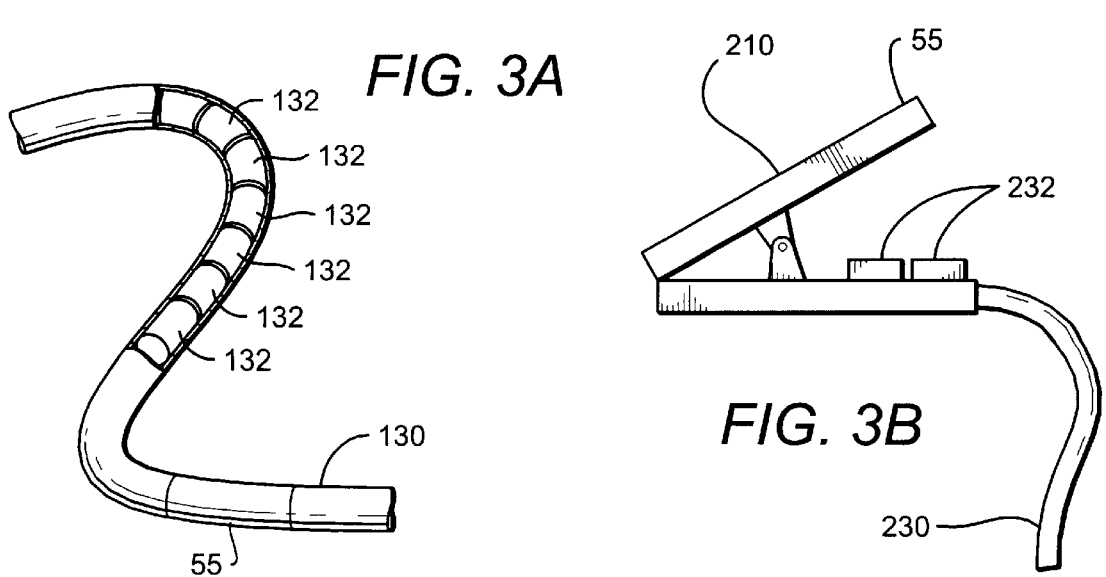
FIG. 3A
FIG. 3B 6,140,797

COMPACT IMPROVED AUTONOMOUS AUXILIARY ENGINE STARTING APPARATUS

This is a continuation-in-part of U.S. application Ser. No. 09/206795, filed Dec. 7, 1998, now U.S. Pat. No. 6,020,716 now allowed, which claims the benefit of U.S. Provisional Application Ser. No. 60/103683, filed Oct. 8, 1998.

FIELD OF INVENTION

The field of the invention is starting cables and auxiliary power devices, such as may be employed to start an engine with a dead battery, in an automobile or other vehicle or engine application.

BACKGROUND OF THE INVENTION

One of the most unpleasant, but seemingly almost unavoidable mishaps in using a motor vehicle or boat or other engine powered apparatus is that, on occasion, there is insufficient electrical power left in the rechargeable (starting) battery to start the engine. Such eventualities may be caused by lack of attention of the operator, age of the battery, failure of the charging system, ambient conditions, leaving lights or other power consuming devices on, or numerous other factors. The problem is particularly pervasive in cold climates, and affects literally thousands of engine starting applications, particularly in recreational or seasonal use devices.

Similar problems also affect devices other than motor vehicles. For example, emergency generators are often battery started, and cannot be conveniently started when the battery is dead, particularly if the engine was unused for a period of time and the battery charge was depleted. This is of particular concern in applications where the rapid and reliable starting of the generator is critical, such as hospitals, communications backup, and military generators.

Inability to start an engine can have relatively high costs. For example, pilots frequently fly into airports or remote grass strips where no auxiliary power is available, and sometimes become stranded if the on-board battery fails. Boaters also find themselves caught with dead batteries in locations where it may be impossible to easily "jump start" their engines. Automobile motorists also often become stranded with dead batteries in their vehicles, often at very inconvenient times and locations, particularly in cold weather situations, where the battery performance is degraded.

There are basically four classes of devices available for emergency starting of automobiles, airplanes, boats, generators and other apparatus using internal combustion engines. Unfortunately, all such devices tend to be quite cumbersome to use.

Perhaps the most widely used class of emergency starting apparatus is characterized by simple jumper cables. Jumper cables typically comprise two insulated wires, about 6 to 20 feet long, which are capable of carrying upwards of 200 Amps for short periods of time. Clamps or clips are generally connected to the ends of the wires to aid in securing electrical contact with battery terminals and "ground" points on the apparatus being started. Known jumper cables are advantageous in being relatively inexpensive and readily configurable for convenient storage, but they suffer from several disadvantages as well. Among other things, jumper cables require a second outside power source, such as the battery of a running automobile or other vehicle, to provide the energy delivered to the battery being jumped. That requirement is of critical importance when another vehicle is unavailable, and also when another vehicle is available, but cannot be positioned close enough for the jumper cables to connect the respective batteries. Still further, jumper cables are problematic, and even dangerous, in requiring the proper connection of four connectors. Improper connection can result in dangerous sparks or even explosions, if volatile fumes are ignited by sparks.

Another class of emergency starting apparatus is characterized by battery start carts. These are wheeled vehicles containing a large capacity battery, or bank of batteries, electrically coupled to high capacity electrically conducting cables. Depending on the anticipated usage, the cables may have either general-purpose clamps or specialized end-mounted connectors. Small start carts mounted on hand truck frames are familiar features in used and new automobile car dealerships, while larger, motor vehicle sized start carts are commonly used in airports to start airplanes. The batteries in portable start carts are generally recharged using line current at a recharging station, although they may also carry their own recharging power source, i.e. gasoline powered generator. The major advantages of start carts are their mobility and relatively high electrical storage capacity, allowing them to provide numerous "jump starts" without recharging.

A major disadvantage, however, is that start carts are inherently too bulky and heavy to be generally carried about in motor vehicles, boats, motorcycles, or other applications. They are also usually more costly than basic portable battery packs.

Another class of emergency starting apparatus is characterized by high powered battery chargers, capable of providing sufficient power to quickly recharge storage batteries, and to augment the battery output power for engine starting. Known high powered charger/boosters are typically devices measuring about 12–24 inches in each dimension, and are usually portable, or have wheels. Unfortunately, they require an outside power source such as line current from a standard household electrical outlet plug. Smaller chargers are available, but typically have relatively low charging rates, and therefore require several hours to recharge a battery with sufficient energy to be used in starting a motor. Such smaller chargers do not have sufficient energy to start most engines by themselves.

A forth class of devices includes portable battery packs with integrated cables, designed to be carried onboard one's vehicle for use when the primary starting battery is depleted and unusable. These portable battery packs are convenient and functional, but somewhat bulky and heavy (typically 15–25 pounds). The cables attached to the battery pack housing are each generally about 12–18" long, so they can be conveniently wrapped around the battery housing and clamped in a safe position to minimize short circuiting them.

Virtually all external auxiliary power devices have one common problem—the liklihood of improper connection to the battery being "jumped", or short circuiting the leads/clamps producing sparks and possible serious damage or fires. This shortcoming has been a concern of potential inexperienced users, especially women who don't like to have to try to make connections under the hood of vehicles, particularly in the dark!

Thus, there is a continuing need to provide improved methods and apparatus that supply independent electrical power for starting engines.

SUMMARY OF THE INVENTION

Methods and apparatus are provided for failsafe emergency starting of engines, especially internal combustion engines, in which the size and location of the power supply with respect to the cable produces high conformability between extended and storage configurations. High conformability of an apparatus is defined herein as being configurable between a greatest extended configuration having a length ($l_e$) and a storage configuration having a length ($l_s$), wherein $l_e$ is greater than 3 $l_s$.

Preferred apparatus have conformability ratios of $\geq 3$, $\geq 4$, $\geq 5$, $\geq 7.5$, and $\geq 10$. Preferred power sources provide an electrical potential of at least 6 volts, and a current of at least 20 amps, with a set of control electronics and switching connection system that allows power to flow only when the proper connections are made, and inhibits current flow if the leads/clamps are short-circuited or cross-wired. More preferable power sources provide sustainable currents of at least 50 amps, and even more preferable power sources provide sustainable currents of at least 250 amps. Preferred cables are relatively long, measuring up to 3 feet or more, allowing more flexibility in applications.

Various objects, features, aspects and advantages of the present invention will become more apparent from the following detailed description of preferred embodiments of the invention, along with the accompanying drawings in which like numerals represent like components.

BRIEF DESCRIPTIONS OF DRAWINGS

FIG. 2 is an electrical schematic of the device of claim 1.

FIG. 3A is a schematic representations of first alternative cable/battery configuration.

FIG. 3B is a schematic representations of first alternative cable/battery configuration.

DETAILED DESCRIPTION

Figure 1:
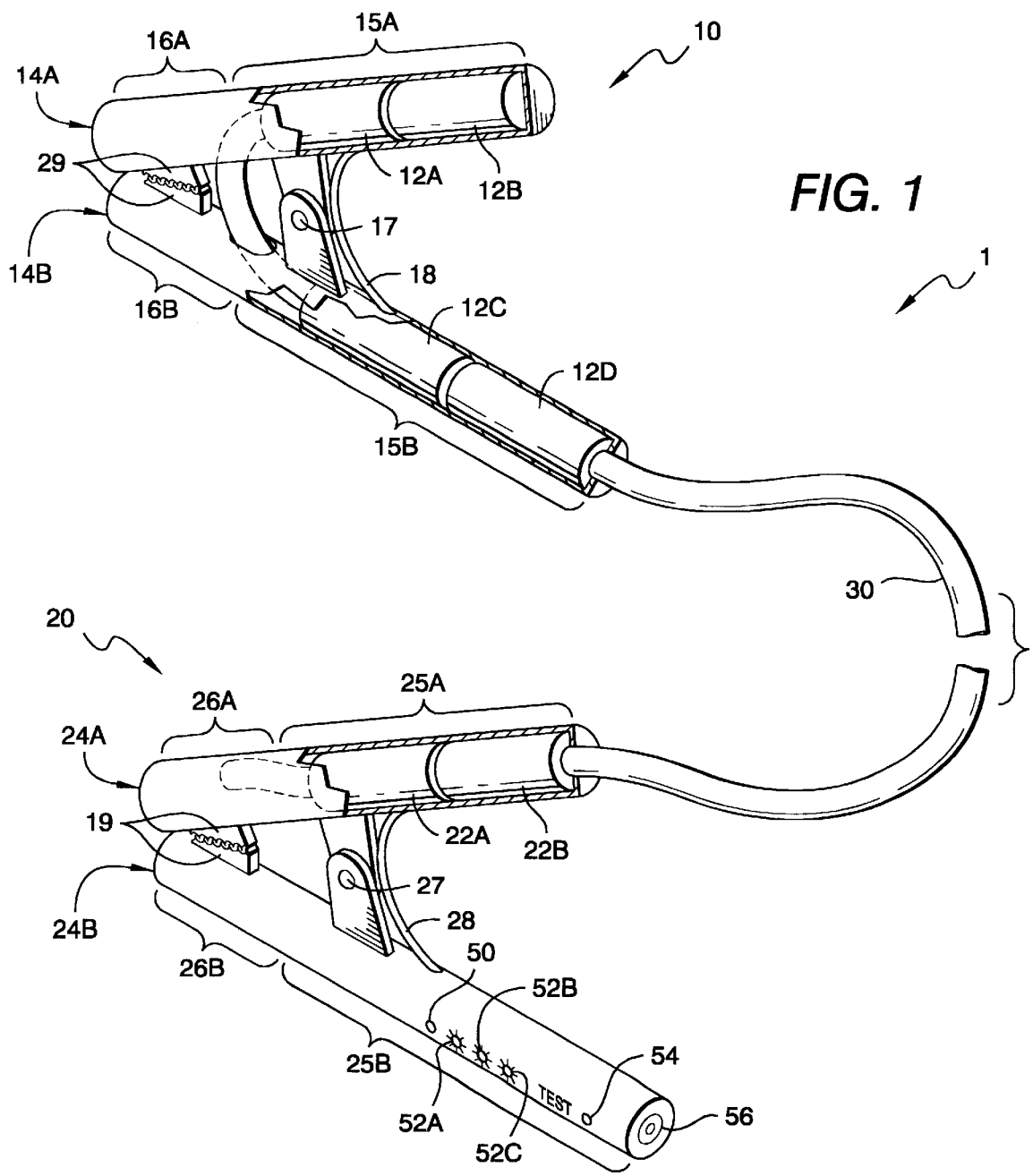
FIG. 1 is a partial cutaway plan view of an engine starting apparatus according to the invention.

In FIG. 1 an engine starting apparatus 1 generally includes two clamps 10, 20 electrically coupled by a cable 30. Clamp 10 contains batteries 12A, 12B, 12C and 12D, and clamp 20 contains batteries 22A and 22B, as well as a charging circuit 50, and a power switching control module 55.

Turning in greater detail to individual components, clamps 10, 20 may advantageously have a similar appearance and operation to ordinary clamps used on previously known jumper cables. Clamp 10, for example, generally comprises two elongated members 14A and 14B, each of which has a handle portion 15A, 15B and a nose portion 16A, 16B. The members 14A, 14B are coupled at pivot 17, and are biased into a clamped position as shown in FIG. 1 with a spring or other biasing means 18. Opposing gripping members 19 are positioned at the nose portions 16A, 16B. Clamp 20 contains corresponding parts: elongated members 24A and 24B; handle portions 25A, 25B; nose portions 26A, 26B; pivot 27; biasing means 28; and opposing gripping members 29. The power control switching module 55 is designed to allow current to flow from the batteries only when the proper polarity connections are made with positive and negative clamps 10 and 20, and to specifically inhibit current flow if the clamps are improperly connected or short circuited, i.e. to the same point (or each other).

Batteries 12A–12D, 22A–22B are preferably compact, ultra high power batteries, and preferably include spiral wound, Thin Metal Film (TMF), 2.0V, 1–2 AH cells produced by Bolder Technology Corp. Other high power density batteries, such as other lead acid, Nickel metal hydride, Lithium Ion, Nickel Cadmium, Nickel Zinc or other chemistries, or even ultracapacitors could be employed. Since most automobiles employ a nominal 12V circuit, the apparatus 1 may advantageously contain 6 such TMF batteries electrically coupled in series, or several banks of cells whose total voltage is 12 or more. Alternative apparatus may employ other configurations of batteries to accommodate other starting environments, especially 6V, 24V, 28V and 36V (nominal) environments. It is further contemplated that a single apparatus could be configured with appropriate switches or other components that permit a user to provide different nominal voltages from the same apparatus.

Batteries employed in contemplated devices are expected to deliver relatively high currents. For automobile starting purposes the batteries should be able to deliver from about 150 A to about 650 A. For other purposes, such as starting motorcycle engines, lesser currents such as 120 A or even 30 A may be acceptable. For other purposes, such as starting airplane and diesel engines, large currents of 200 A or even 500 A or more are contemplated. These current values are defined herein to be sustained average currents over a period of at least 3 seconds, rather than current spikes.

It is still further contemplated to use other power sources in place of or in addition to batteries. For example, ultra capacitors could be employed, which may have the added advantage of an expected lifetime (500,000 uses), far greater than that of other components like conventional batteries. Thus, unless the context indicates otherwise, it should be understood that use herein of the terms "battery" or "batteries" are intended to convey the broader scope of "power source" and "power sources", respectively or vice versa.

Inclusion of batteries 12A–12D, 22A–22B within the clamps 10, 20 is thought to be particularly advantageous because it allows the entire apparatus 1 to be folded up, or otherwise configured in a compact fashion. Highly configurable apparatus can thus be conveniently stored in an automotive trunk, under an automotive seat, stuffed into a glovebox, or even conveniently carried in a pouch. Thus, the size and disposition of the power supply is contemplated to be an important factor in producing high conformability between extended and storage configurations. The power control switching module 55 is designed to allow current to flow from the batteries only when the proper polarity connections are made with positive and negative clamps, and to specifically inhibit current flow if the clamps are connected together or as a short circuit, i.e. to the same point or ground. This is a very important safety feature. It is also contemplated that module 55 may protect the batteries from over discharge by disconnecting the output when the voltage drops below a predetermined level.

The concept of configurability can be addressed in many ways. For example, configurability may be considered to relate the greatest length to which an object can be extended in an extended configuration, against the greatest linear dimension of the same object in a storage configuration. This can be readily appreciated by considering specific examples. A typical start cart employed in jump-starting automobiles at an automotive car lot is on the order of about four feet tall, 18 inches wide, and about 12 inches deep. There are generally two 3 to 5 foot cables, each coupled to one of the terminals of the battery or batteries, and in an extended configuration the overall length (i.e., the longest dimension)

from the tip of one cable to the tip of the other cable, or tip of one cable to the farthest end of the battery cart, is about 7 to 10 feet. The storage configuration, however, has a length corresponding to the height of the cart, namely about 4 feet. Thus, the ratio of longest dimension in the extended configuration to longest dimension in the storage configuration is about 1:5 to 2.5:1. By comparison, some of the new portable battery packs have integrated cables that extend up to 18" from either side of a main housing that is typically about 9" wide by 13" high. The total extended width of the cables is about 30–45", compared to a stored diagonal length of the housing of up to 18", yielding a ratio of longest dimension in the extended configuration to longest dimension in the storage configuration of about 1:5 to 2.5:1. Also, since these leads are connected directly to the portable internal batteries, they are always "live" and subject to potential short circuiting.

In a preferred embodiment according to FIG. 1, the greatest extendable length is about 36–45", but the apparatus can be coiled into a storage configuration having a greatest length of no more than about 12 inches. This provides a ratio of greatest extended configuration ($l_e$) to greatest length in storage configuration ($l_s$) of more than 3. Other contemplated high conformability ratios are at least 3.5, at least 4, at least 5, at least 7.5 and at least 10, all of which can be achieved using the principles disclosed herein. The 10 ratio, for example, may be achieved using a relatively long and thin cable of 10 feet or more, and coiling the cable around the connectors so that the entire storage configuration is no more than one foot in any dimension (i.e., length, width or height).

Figure 3C:
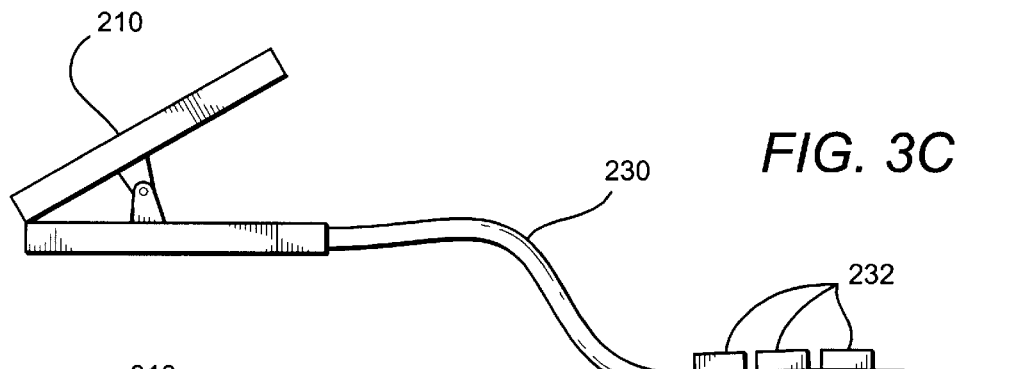
FIG. 3C is a schematic representations of first alternative cable/battery configuration.
Figure 3D:
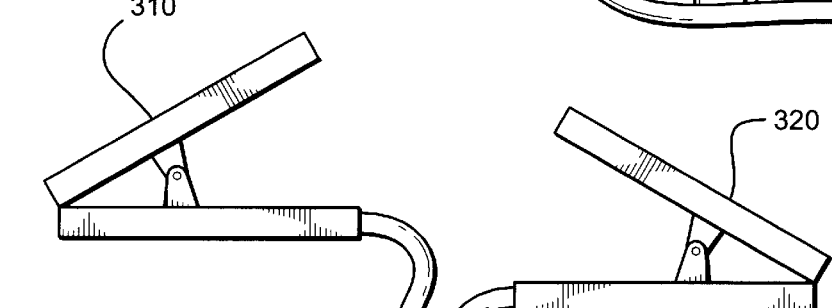
FIG. 3D is a schematic representations of first alternative cable/battery configuration.
Figure 3E:
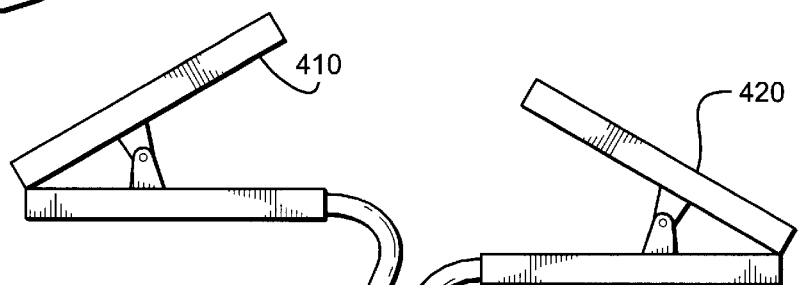
FIG. 3E is a schematic representations of first alternative cable/battery configuration.
Figure 3E:
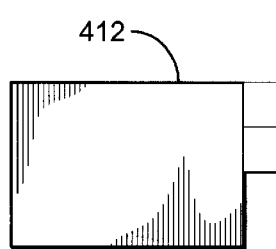

The high conformability of apparatus contemplated herein is not limited only to configurations where the batteries are disposed in the clamps. Among the many alternative embodiments, one or more of the batteries could be placed in line with the cable 130, so that for some section the cable itself consists of interconnected batteries 132 (see FIG. 3A) so as to form an elongated power source comprising multiple cells/batteries flexibly (i.e. the "line" of batteries can be bent so as to change the distance between its ends) linked together. In other embodiments, some or all of the batteries 232 could surround or otherwise juxtapose one or more of the clamps 210 (see FIG. 3B) or cable 230 (see FIG. 3C). In still other embodiments one or more of the batteries could extend to the cable 330 from a power supply box 312 (see FIG. 3D) or cables 430 could be removably attached to box 412 via connectors 415 (see FIG. 3E).

Cable 30 is contemplated to comprise any suitable current carrying conductor, including wires, packed powders or other compositions, jointed bars, and so forth. Wire cables, including solid, twisted, or braided wires, are most preferred due to their relatively low cost and relatively high reliability. The conductive material is likewise contemplated to be any suitable material, including copper, aluminum, braided wire, alloys, graphites, and so forth. It is preferred that the conductive material be insulated, and suitable insulation material such as rubber, neoprene, nylon, cloth, and plastic are known.

Cables may be provided in any number of different lengths. Contemplated cables may measure as little at 8 inches or less (measured from the connection points of opposite clamps) to as much as 36 inches or more. Exemplary cables measure at least 10", 12", 15", –20", 24", 30", 36" and 45". Particularly long cables are contemplated to measure at least 5 feet, or even 10 feet in extended configurations.

In a particularly preferred class of embodiments the cable is at least 20 inches in length, and the power source provides a current of at least 50 amps across the at least two connectors. In another particularly preferred class of embodiments the cable is at least 24 inches in length, and the power source provides a current of at least 200 amps across the at least two connectors. In other particularly preferred classes of embodiments the cable is at least 40 inches and 60 inches in length, respectively, and the power source provides a current of at least 100 amps across the at least two connectors. Embodiments including a power source capable of providing currents of 100, 250, 400 and 600 amps are contemplated as well.

In FIG. 1 charging circuit 50 is fitted within the handle portion 25B of clamp 20. As shown, the charging circuit 50 may advantageously include indicator lamps 52A, 52B, and 52C, a test button 54, and an external power jack 56, for recharging the batteries. The power control switching module 55 is designed to allow current to flow from the batteries only when the proper polarity connections are made with positive and negative clamps, and to specifically inhibit current flow if the clamps are connected together or as a short circuit, i.e. to the same point or ground.

In preferred embodiments, an energy storage device included in the power source has a preferred operating capacity and can be recharged from a state at which it has 50% or less of the preferred operating capacity to a state in which it has at least 90% of the preferred operating capacity in less than 20 minutes.

The embodiments and applications disclosed herein can be made to start virtually any vehicle or aircraft, or other internal combustion engine, including diesels and industrial engines on stationary apparatus like emergency pumps, generators, farm machinery, etc. Despite having very large current delivery capacity, these apparatus will often be are more convenient than other devices to use, and will generally be more convenient to store, due to their high conformability. Such apparatus may be referred to as "autonomous start cables" or "Hot Wires™".

Thus, specific embodiments and applications of an improved engine starting apparatus have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. An auxiliary engine starting apparatus comprising:
    at least two connectors;
    a power source providing an electrical potential of at least 6 volts across the at least two connectors and the capacity to provide at least 20 amps to a load bridging the at least two connectors;
    the apparatus configurable between a first configuration in which the apparatus has a length $l_e$ and a second configuration in which the apparatus has a length $l_s$, wherein $l_e \geq 3\, l_s$, and the length of the apparatus is equal to the greatest distance between any two points on the apparatus.

2. The device of claim 1 wherein $l_e \geq X\, l_s$ where X is one of 3.5, 4, 5, 7.5 and 10.

3. The device of claim 1 wherein the power source comprises at least one energy storage device including at least one of a battery, a capacitor, and an ultracapacitor; and a power control switching module designed to sense the polarity of a charged load bridging the two connectors and to allow current to flow through the load only when the polarity of the load matches the polarity of the voltage across the at least two connectors, and the load current can be provided by the power source without damaging the device or any component thereof.

4. The device of claim 3 wherein the power source comprises a battery box and the device further comprises at least two cables, each of the at least two connectors coupled to a cable, each cable and connector pair removably coupled to the battery box.

5. The device of claim 3 wherein the at least one energy storage device has a preferred operating capacity and can be recharged from a state at which it has 50% or less of the preferred operating capacity to a state in which it has at least 90% of the preferred operating capacity in less than 20 minutes.

6. The device of claim 5 wherein $l_e \geq X\, l_s$ where X is one of 3.5, 4, 5, 7.5 and 10.

7. The device of claim 5 wherein the power source is elongated and has a length at least B times its width or diameter where B is one of 8, 15, 25, 40 and 70.

8. The device of claim 7 wherein the power source has a first end and a second end and the distance between the first and the second end can be modified.

9. The device of claim 8 wherein the power source comprises a plurality of cells flexibly linked together.

10. The device of any of claim 9 wherein $l_e \geq X\, l_s$ where X is one of 3.5, 4, 5, 7.5 and 10.

11. The device of claim 5 wherein the power control switching module comprises a solenoid and control logic.

12. The device of claim 5 wherein the power source detaches from the at least two cables in configuring the device in the storage configuration.

13. The device of claim 5 wherein the cable is at least L inches in length wherein L is 8, 24, and 36.

14. The device of claim 5 wherein the cable is at least 18 inches in length, and the power source provides a current of at least A amps across the at least two connectors/clamps where A is one of 100, 250, 400 and 600.

15. The device of claim 5 wherein electrical potential provided by the power source across the at least two connectors is at least V volts where V is one of 12, 24, and 36.

16. The device of claim 5 wherein the power source comprises a battery box and the device further comprises at least two cables, each of the at least two connectors coupled to a cable, each cable and connector pair removably coupled to the battery box.

17. The device of claim 16 wherein the power control switching module comprises a solenoid and control logic.

* * * * *